Aug. 25, 1970  W. A. ILLAR  3,525,539

PULL YOKE ASSEMBLY FOR ARTICULATED VEHICLE

Filed Nov. 8, 1968

INVENTOR.
William A. Illar

BY

E. J. Biskup
ATTORNEY

United States Patent Office 3,525,539
Patented Aug. 25, 1970

1

3,525,539
PULL YOKE ASSEMBLY FOR ARTICULATED
VEHICLE
William A. Illar, Cleveland, Ohio, assignor to General
Motors Corporation, Detroit, Mich., a corporation of
Delaware
Filed Nov. 8, 1968, Ser. No. 774,315
Int. Cl. B60d 1/00
U.S. Cl. 280—483                                5 Claims

ABSTRACT OF THE DISCLOSURE

An articulated vehicle having the two frame sections interconnected by a pull yoke assembly for steering about a substantially vertical axis and providing relative oscillation of the frame sections about a pair of vertically spaced longitudinally extending substantially horizontal axes. Yieldable means are provided in the pull yoke assembly for resisting relative oscillation of the frame sections about one of the horizontal axes except when one of the frame sections cannot oscillate freely about the other of the horizontal axes.

---

This invention concerns an earthmoving vehicle of the type having a tractor unit and a trailer unit, both of which are interconnected by a hitch and pull yoke assembly which permits the units to move relative to each other about a vertical axis for steering purposes and about a horizontal longitudinally extending axis when the vehicle is driven over uneven ground. In vehicles of this type extremely large stress concentrations occur in the gooseneck portion of the pull yoke structure especially when the vehicle is in a turn and is proceeding over bumps. During such time the gooseneck portion is placed in torsion and depending upon the load being carried by the trailer unit and the severity of the bumps encountered, there is always the danger of a fracture in the plate structure which makes up the pull yoke. In order to preclude such occurrence, the present pull yoke design requires that the gooseneck portion be excessively large in cross-sectional dimension; however, this has not solved the problem and occasionally the torsional stress concentrations will damage the gooseneck portion and create problems of repair and maintenance.

The present invention is intended to alleviate the above problem by providing a two-part pull yoke assembly which serves to couple the tractor unit to the trailer unit so not only is steering movement available about a substantially vertical axis but also relative oscillation is permitted between the two units about a pair of vertically spaced substantially horizontal anl longitudinally extending axes. In the preferred form the pull yoke assembly made according to the invention includes a mounting member which is tubular in form and has one end supported by the usual king pin carried by the tractor unit for movement about a first longitudinally extending horizontal axis. The other end of the mounting member extends within a cylindrical opening formed in the gooseneck and is supported thereby in a manner which precludes all axial relative movement but provides rotational movement between the two members about a second longitudinally extending horizontal axis. Yieldable means in the form of rubber spacer members are interposed between the two members so that normally all oscillation between the tractor and trailer units is about the first horizontal axis provided by the king pin member. However, under conditions where the tractor unit is turned relative to the trailer unit and is moving up or down an incline, the mounting member is adapted to rotate relative to the gooseneck so as to compress the yieldable means and thereby provide oscillation about the second horizontal

2 axis. Thus, to the extent the gooseneck is free to rotate about the second horizontal axis, torsional strain normally imposed on the gooseneck portion of the pull yoke assembly is eliminated.

The objects of the present invention are to provide a pull yoke assembly for an earthmoving vehicle which serves to interconnect a tractor unit with a trailer unit for steering movement about a substantially vertical axis and permits relative oscillation between the two units about first and second vertically spaced substantially horizontal and longitudinal extending axes; to provide a coupling arrangement for connecting the longitudinally spaced frame sections of an articulated vehicle in a manner whereby the two frame sections can be relatively movable about a substantially vertical axis and also can oscillate about a first horizontal and longitudinally extending axis during normal straight-ahead operating conditions and about a second horizontal longitudinally extending axis when the vehicle is in a turn and moving up or down an incline; to provide a pull yoke assembly supported by a tractor unit and having a two-part gooseneck portion between which yieldable means are interposed so as to relieve torsional stresses normally encountered by the gooseneck when the tractor is operating under adverse conditions; and to provide a pull yoke assembly for a scraper which includes a two-part gooseneck portion connected together for relative rotation about a horizontal axis extending longitudinally of the scraper and having rubber-type inserts located between the two parts for absorbing torsional stresses imposed on the gooseneck during relative movement between the tractor and trailing bowl as the scraper moves over irregular ground. Further objects and advantages of the present invention will be more apparent from the following detailed description when taken with the drawing in which:

Figure 1:
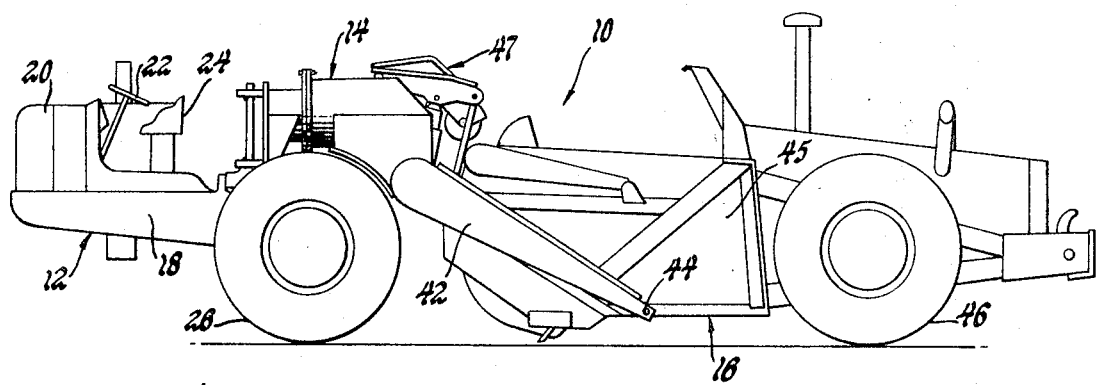
FIG. 1 is a side elevational view showing an earthmoving scraper incorporating a pull yoke assembly made in accordance with the invention.

Referring to the drawing and more particularly FIG. 1 thereof, an earthmoving scraper vehicle 10 is shown comprising an overhung tractor unit 12 connected by a pull yoke assembly 14 made in accordance with the invention to a trailer unit or bowl 16 which normally serves to cut and retain material during a digging operation.

The tractor unit 12 includes a frame section 18 which supports an engine (not shown) located in an engine compartment 20 adjacent to an operator's station having the usual steering wheel 22 and operator's seat 24. The rear end of the frame section 18 is rigidly mounted on a transverse axle which supports a rubber wheel 26 located on each side of the tractor unit. The frame section 18 also has a pair of upstanding and axially spaced trunnions 28 and 30 rigidly formed thereon which serve as retainers for the opposite ends of a pivot pin 32 located midway between the sides of the frame section and extending longitudinally thereof. The pivot pin 32 supports the base section of a king pin 34 which in turn provides a substantially vertical axis A about which the tractor unit 12 is steerable through conventional steering mechanism not shown but well known to those skilled in the art.

Figure 2:
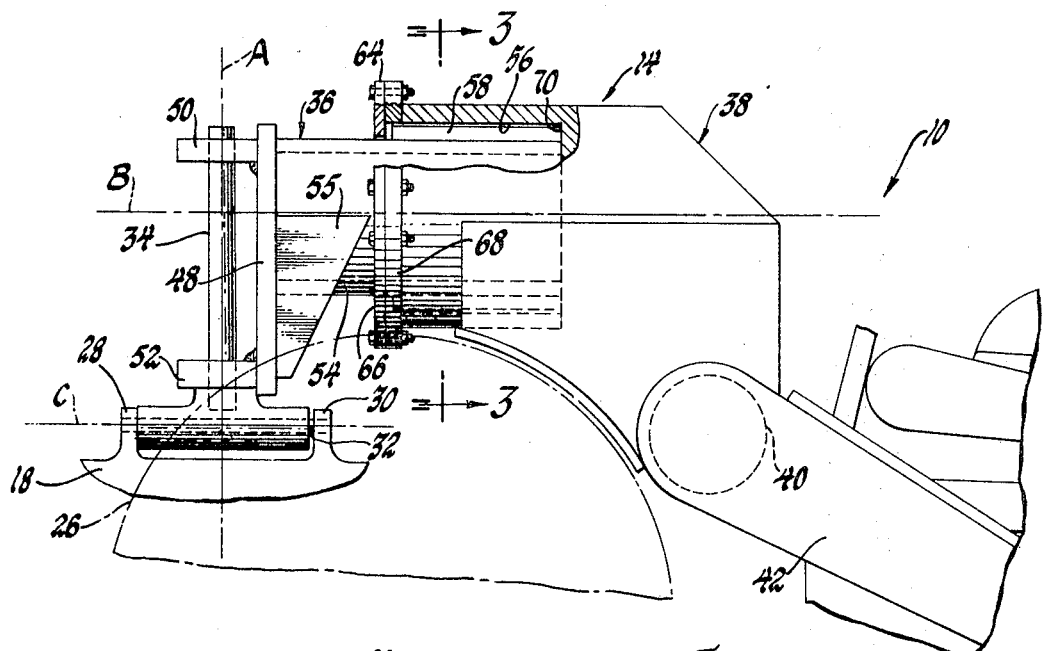
FIG. 2 is an enlarged view of the pull yoke assembly incorporated with the scraper of FIG. 1.

As best seen in FIG. 2, the pull yoke assembly 14 is connected to the king pin 34 and supported thereby for relative movement about the aforementioned steer axis A. The pull yoke assembly 14 comprises a gooseneck portion which includes two parts, one of which is a mounting member 36 and the other a support member 38 which is rigidly secured to the usual transverse torque tube 40, the opposite ends of which are secured to laterally spaced and rearwardly extending pull arms, one of which is identified by the numeral 42. As seen in FIG. 1, the rear end of each of the pull arms is connected through a spherical connection 44 to the lower forward end of a structural frame section 45 which forms the trailer unit 16. An axle, having a wheel 46 on each side of the frame section 45, supports the rear of the trailer unit which is movable between a lowered position and a raised position by a bowl control mechanism 47 supported by the pull yoke assembly 14.

Figure 3:
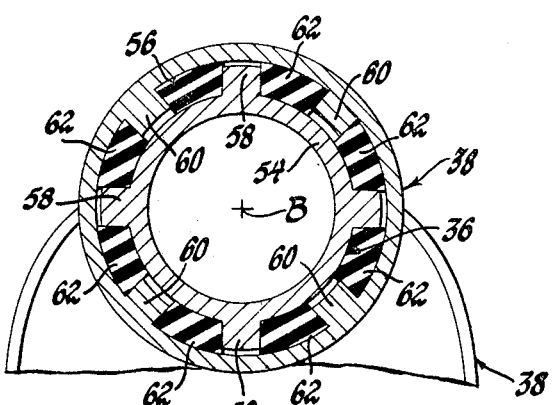
FIG. 3 is an enlarged sectional view taken on line 3—3 of FIG. 2.

The mounting member 36 which forms one part of the gooseneck portion includes a rectangular plate member 48, the front surface of which rigidly supports vertically spaced pivot supports 50 and 52, each of which includes an appropriate aperture through which the king pin extends. The rear surface of the plate member 48 is rigidly secured to one end of a tubular member 54 which extends rearwardly and has its center longitudinal axis B located in a horizontal plane. The forward portion of the tubular member 54 is braced at each side thereof by a reinforcing member 55 while the rear portion is located within an accommodating cylindrical opening 56 formed within the support member 38 and has four rib or key portions 58 radially extending from the surface thereof and angularly spaced approximately 90° from each other. Similarly, the support member 38 has four rib or key portions 60 which extend radially inwardly and are angularly spaced 90° from each other as seen in FIG. 3. The key portions 58 formed with the tubular member 54 lie in a vertical and horizontal plane, while the key portions 60 formed with the support member 38 are located in mutually perpendicular planes angularly spaced approximately 45° from the vertical or horizontal plane so as to provide the staggered arrangement seen in FIG. 3. It will be noted that the key portions of both the tubular member 54 and the support member 38 extend longitudinally with a uniform cross section and are of equal length. Moreover, as seen in FIG. 3, located between each pair of key portions 58 and 60 along the full length thereof is a rubber member 62 which serves as a spacer and is adapted to yield under conditions to be described.

The mounting member 36 is held from axial movement relative to the support member 38 by a pair of arcuately-shaped split washers 64 and 66 located above and below a horizontal plane passing through the axis B and fastened to a radially extending flange 68 rigid with the support member 38. Thus, as seen in FIG. 2, the rear end of the tubular member 54 is adapted to abut against a fixed wall 70 rigid with the support member 38 while the front end of the key portions 58 is in contact with the washers 64 and 66. Therefore, movement between the mounting member 36 and the support member 38 is restricted to rotary movement about the axis B and this movement is dependent upon whether or not free rotation of the king pin about a horizontal longitudinally extending axis C passing through the center of the pivot pin 32 is permitted as will now be explained.

From the above description it should be apparent that the pull yoke assembly 14 when combined with the king pin 34 supported by the tractor unit 12 provides an arrangement whereby steering movement of the tractor unit 12 is permitted about the vertical steer axis A and relative oscillation between the tractor and trailer units is allowed about the parallel and vertically spaced horizontal axes B and C. As is conventional with vehicles of this type, the axles are rigidly secured to the associated frame sections and accordingly oscillation of one unit relative to the other about a longitudinally extending horizontal axis such as axis C must be provided to permit the vehicle to traverse irregular ground. This pull yoke assembly, however, provides the additional oscillation axis B which comes into play under conditions when the tractor unit 12 or trailer unit 16 is not able to oscillate about the axis C. When this occurs, relative movement between the units is realized about the axis B at which time the rubber members 62 are compressed with resulting extrusion which fills in the spaces between the outer surface of the key portions 58 and the inner surface of the opening 56, and the inner surface of the key portions 60 and the outer surface of the tubular member 54. Thus, it should be apparent that by providing the coupling arrangement described above within the gooseneck portion of the pull yoke assembly 14, it is possible to relieve various torsional stress concentrations which normally occur in the structure. For example, assuming that the tractor unit 12 is placed in a 90° turn and proceeds to move up or down an incline, it should be apparent that under such conditions severe torsional forces would act upon the gooseneck portion if the latter was constructed in the usual manner. With this invention, however, the mounting member 36 is permitted to rotate relative to the support member 38 about axis B thereby preventing fracture or rupture of the gooseneck portion.

Various changes and modifications can be made in this construction without departing from the spirit of the invention. Such changes and modifications are contemplated by the inventor and he does not wish to be limited except by the scope of the appended claims.

I claim:

1. The combination with a vehicle having a first frame section and a second frame section, a coupling for connecting said first frame section to said second frame section for steering movement about a substantially vertical axis and providing selective relative oscillation between said frame sections about first and second vertically spaced substantially horizontal and longitudinally extending axes, said coupling comprising an upstanding king pin having its lower end supported by the first frame section for movement about said first horizontal axis, a mounting member having one end connected to said king pin for movement about said vertical axis, a support member connected to said second frame section and supporting the other end of the mounting member for movement about the second horizontal axis, and means including yieldable means interposed between said mounting member and said support member for resisting relative oscillation between said frame sections about the second horizontal axis except when said second frame section is turned relative to said first frame section about the vertical axis.

2. An earthmoving vehicle having a tractor unit drawing a material-retaining trailer unit, a coupling connecting said tractor unit to said trailer unit for steering movement about a substantially vertical axis and providing selective relative oscillation between said units about first and second vertically spaced substantially horizontal and longitudinally extending axes, said coupling comprising a king pin having its lower end supported by the tractor unit for movement about said first horizontal axis, a support member connected to said trailer unit, a mounting member having the forward end thereof connected to said king pin for movement about said vertical axis, and yieldable means connecting the rear end of said mounting member to the support member for resisting relative oscillation between the tractor and trailer units about the second horizontal axis except when said tractor unit is turned relative to said trailer unit about the vertical axis.

3. An earth moving vehicle having a tractor unit drawing a trailer unit, a pull yoke assembly connecting said tractor unit to said trailer unit for steering movement about a substantially vertical axis and providing selective relative oscillation between said units about first and second vertically spaced substantially horizontal and longitudinally extending axes, said pull yoke assembly including an upstanding king pin having its lower end supported by the tractor unit for movement about said first horizontal axis, a support member connected to said trailer unit, a cylindrical opening formed in the forward portion of said support member, a mounting member having the forward end thereof connected to said king pin for movement about said vertical axis, the rear end of said mounting member being formed as a tube and located within said cylindrical opening for pivotal movement about the second horizontal axis, and yieldable means interposed between said mounting member and the support member for resisting relative oscillation between the tractor and trailer units about the second horizontal axis except when said tractor unit is turned relative to said trailer unit about the vertical axis.

4. An earthmoving vehicle having a tractor unit drawing a material-retaining trailer unit, a pull yoke assembly connecting said tractor unit to said trailer unit for steering movement about a substantially vertical axis and providing selective relative oscillation between said units about first and second vertically spaced substantially horizontal and longitudinally extending axes, said pull yoke assembly including an upstanding king pin having its lower end supported by the tractor unit for movement about said first horizontal axis, a support member including a pair of rearwardly extending and laterally spaced arms connected to said trailer unit, a cylindrical opening formed in the forward portion of said support member, a mounting member having the forward end thereof connected to said king pin for movement about said vertical axis, the rear end of said mounting member being formed as a tube and located within said cylindrical opening for pivotal movement about the second horizontal axis, means precluding relative axial movement between the mounting and support members, and yieldable means interposed between said mounting member and the support member for resisting relative oscillation between the tractor and trailer units about the second horizontal axis except when said tractor unit is turned relative to said trailer unit about the vertical axis.

5. An earthmoving vehicle having a tractor unit drawing a material-retaining trailer unit, a pull yoke assembly connecting said tractor unit to said trailer unit for steering movement about a substantially vertical axis and providing selective relative oscillation between said units about first and second vertically spaced substantially horizontal and longitudinally extending axes, said pull yoke assembly including an upstanding king pin having its lower end supported by the tractor unit for movement about said first horizontal axis, a support member including a pair of rearwardly extending and laterally spaced arms connected to said trailer unit, a cylindrical opening formed in the forward portion of said support member, a mounting member having the forward end thereof connected to said king pin for movement about said vertical axis, the rear end of said mounting member rigidly supporting a tubular member which is located within said cylindrical opening for movement about the second horizontal axis, a plurality of circumferentially spaced and longitudinally extending rib portions alternatively formed on the support member to extend in the cylindrical opening and on the outer surface of the tubular member, and resilient means interposed between the respective rib portions for resisting relative oscillation between the tractor and trailer units about the second horizontal axis except when said tractor unit is turned relative to said trailer unit about the vertical axis.

References Cited

UNITED STATES PATENTS

| | | | |
|---|---|---|---|
| 1,853,701 | 4/1932 | Schlaegel | 280—438 |
| 2,518,742 | 8/1950 | Armington et al. | |
| 2,720,417 | 10/1955 | Kling | 298—18 |
| 3,122,382 | 2/1964 | Carrier | 280—438 |
| 3,309,111 | 3/1967 | Vaugoyeau | 280—438 |
| 3,443,826 | 5/1969 | Hermiz | 280—492 |

LEO FRIAGLIA, Primary Examiner

U.S. Cl. X.R.

37—129; 280—440, 492